July 8, 1952

R. ANXIONNAZ ET AL 2,602,289

METHOD AND MEANS FOR PROPELLING A VEHICLE
USING NORMALLY GASEOUS FUEL AS A LIQUID

Filed May 17, 1946

INVENTOR
René Anxionnaz &
M. H. L. Sidille
By Watson, Cole, Grindle & Watson

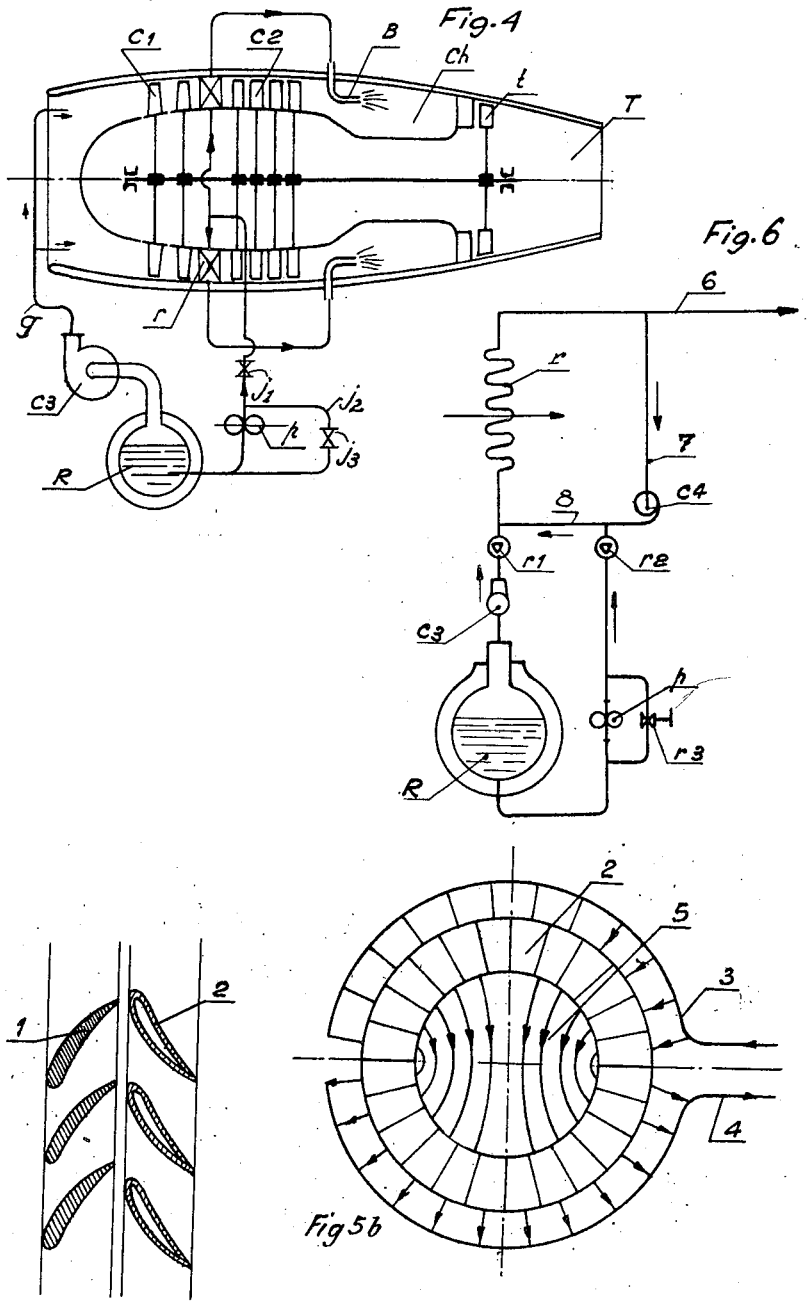

Patented July 8, 1952

2,602,289

UNITED STATES PATENT OFFICE 2,602,289

METHOD AND MEANS FOR PROPELLING A VEHICLE USING NORMALLY GASEOUS FUEL AS A LIQUID

René Anxionnaz and Marcel Henri Louis Sédille, Paris, France; said Sédille assignor, by direct and mesne assignments, to Societe Rateau (Société Anonyme), Paris, France, a company of France Application May 17, 1946, Serial No. 670,324
In France May 25, 1945

9 Claims. (Cl. 60—35.6)

When it is desired to use for propelling vehicles of any kind, whether aerial, terrestrial or seafaring, fuel which is normally gasiform at the temperature and pressure inside the medium through which the vehicles move, difficulties are met for storing such fuel on board.

Such a fuel occupies a considerable volume in its normal state. To reduce this volume, it is necessary to store up the gaseous fuel under a high pressure, but in this case the walls of the containers must be thick, which increases their weight in an often prohibitive manner.

An object of the present invention is to provide a fuel feed device for supplying a thermic engine on board a vehicle with fuel which is normally gaseous at ambient temperature and pressure and which is stored in its liquid form at low temperature inside a heat-insulated container, the volume of which, above the level of liquid, is filled with fuel in the gaseous form vaporized by the unavoidable heat leakages through the walls of the container, means being provided for leading off from this container to said engine fuel both in its gaseous and liquid forms.

A further object of the invention is to provide pumps or compressors for independently controlling the flows of gaseous and liquid fuel. By the term "pump" herein is meant one of any suitable kind such as a piston pump, a centrifugal pump, a volumetric pump and so forth.

A still further object is to provide for vaporization and hearing of the fuel before intake into the engine through heat exchange with air supplied to this engine, thereby cooling this air.

Other objects and advantages of the invention will be apparent during the course of the following description.

In the accompanying drawing in which like reference characters are employed to designate like parts throughout the same:

Figs. 3 and 4 illustrate forms of application of the invention to a reaction jet propeller with a gas turbine for driving the air compressor, and with or without air by-pass means for the said gas turbine.

Figure 5a is a developed section of the blades of an air compressor arranged for circulation of the fuel to be vaporized.

Figure 5b is a diagrammatic view of the connections between the blades of such a compressor.

Figure 6 illustrates diagrammatically a circuit for the fuel, adapted to hinder the formation of ice on the vaporizer.

Figure 1:
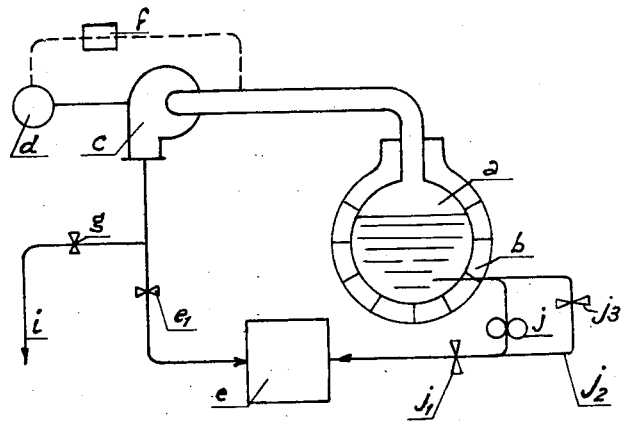
Figure 1 illustrates diagrammatically one embodiment of a suitable device for feeding an internal combustion plant with liquified gas.

When fuel is stored on board a vehicle in its liquid state under a temperature lower than that of the ambient atmosphere, which may be the case for hydrogen and other fuels which are normally gaseous at the temperature and pressure of the ambient atmosphere, care should be taken to avoid its heating and vaporization. It is possible to apply for instance the known means applied in the art of heat insulation and to make use of double-walled vessels such as $a$ as shown in Fig. 1 with vacuum prevailing at $b$ between the two walls, which latter may in fact be polished in order to avoid any losses through radiation. The double-walled vessel may be reinforced in order to resist the action of vacuum.

In spite of the care exercised, there always exists a certain heating of the liquefied gaseous fuel and a more or less considerable evaporation takes place. The latter forms a net loss if no special care is taken for the use of this gaseous fuel. Furthermore the containers should be provided with a safety valve or like device for limiting the increase of pressure caused by the vaporization inside a closed chamber. Such an arrangement forms a serious danger as the losses of gasiform fuel may produce with atmospheric air an explosive mixture which may be ignited fortuitously.

According to the invention, the vaporized fuel is used first for feeding the propelling plant of the vehicle and the liquid fuel is used only to the extent of the insufficient provision of vaporized fuel. Thus in the embodiment of Fig. 1, the interior of the container $a$ communicates with a compressor $c$ driven by an auxiliary motor $d$ in a manner such that the fuel vapors may be brought to the pressure required with a view to their use inside the plant $e$. A pressure regulator $f$ acts through any suitable means on the motor $d$ driving the compressor so as to hold the pressure inside said container $a$ at a value which is not critical for the mechanical resistance of said container. In case of a stopping of the plant $e$ or if the output of vaporized fuel is larger than the consumption of said plant, the gasiform fuel is exhausted into the atmosphere through the pipe $i$ provided with a cock $g$. This exhaust is provided at a point where the mixture of fuel with the ambient atmosphere is not dangerous. If required this gasified fuel may be led to special burners and ignited.

There is shown moreover in Fig. 1 a fuel pump $j$ providing for the injection of fuel in liquid state inside the plant $e$. The use of gasiform fuel during operation of the plant before the use of any liquid fuel is obtained by opening completely the cock $e1$ located between the compressor $c$ and the plant $e$; the adjustment of the output delivered by the plant is obtained by adjusting the cock $j1$ inserted at the delivery end of the pump $j$ or on a cock $j3$ inserted in a by-pass $j2$ between the suction end of the pump and its delivery end. If the container of liquefied fuel is able to resist the pressure of the vaporized fuel, the compressor $c$ may be omitted in which case the feed of gaseous fuel from the container is effected under the natural pressure of this gasified fuel, while the feed of liquid fuel may be done by setting the container under load above the plant to be fed when the pressure of admission of the fuel to the burners allows such an arrangement.

The liquid fuel being at a temperature lower than that of the ambient atmosphere, the heat which may be used directly inside the internal combustion plant will be lower than the calorific power of this fuel as theoretically calculated, starting from the normal temperature of the ambient atmosphere, and the difference is equal to the heat required for bringing the fuel from its temperature inside the container to ambient temperature.

For a fuel which is gaseous at ambient temperature but is stored in its liquid state at a reduced temperature, this difference is equal to the sum of the latent vaporization heat and of the heat required for bringing the fuel in its gaseous state from the storing temperature to the ambient temperature. According to a second feature of the invention means are provided for recuperating heat in the cycle of the internal combustion plant to be fed in order to avoid the said loss of heat and to produce moreover a complementary important useful effect.

It is a well known fact that in an internal combustion plant such as $e$ which may be a reciprocating engine such as a diesel or an explosion engine, or a gas turbine, or a reaction jet propeller or again an association of such types of engines, a fluid such as atmospheric air moving through said engine describes a thermic cycle beginning with a compression. In the arrangements according to the invention and using a gasiform fuel stored under liquid form at low temperature, said fuel is used for cooling the fluid before or during compression. This allows an economy of the power required for compression and in the case of reciprocating engines the power of the engine per unit of weight is increased. Moreover the amount of heat adapted to be used per unit of weight of fuel is increased by the amount required for heating the latter and even by the vaporization heat thereof if it is vaporized before use. The arrangement operates thus as a heat pump, the calories introduced into the cycle being produced by the ambient atmosphere.

If this cooling of the motive fluid is performed during its compression, the fuel may be heated beyond the ambient temperature. Of course such heat exchanges may be performed in countercurrent relationship, the fuel being gradually heated in contact with the motive fluid which is being more and more compressed.

Figure 2:
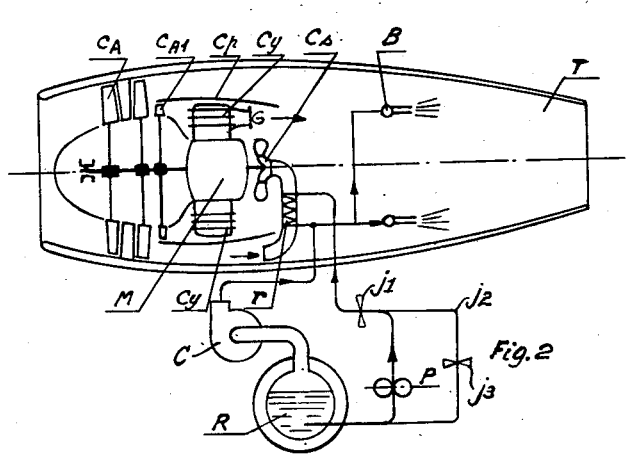
Fig. 2 illustrates the application of the invention to a reaction jet propeller including an air-cooled supercharged piston engine.

Fig. 2 shows by way of example a reaction jet propeller including a piston engine M driving an air compressor $C_A$ and an auxiliary air compressor $C_{A1}$ for the air adapted to cool the engine M, the cylinders $C_y$ of which are arranged within the cowl $C_p$. The air delivered by the compressor $C_A$ and admixed with the exhaust gases from the engine M is heated through a combustion effected inside the burners B and expands finally through the reaction jet nozzle T.

The piston engine M is of any known type. It may be fed with any usual fuel the storing of which offers no difficulty. It is however theoretically possible to use also for this engine a fuel of the category forming the object of the invention such as hydrogen, which has a considerable calorific power and shows consequently important advantages. The difficulties inherent in combustion of hydrogen in reciprocating engines lead however in most cases to avoidance of such fuel. However, these difficulties do not apply to burners such as B of the reaction jet and such fuel can be used for feeding these burners.

In the arrangement of Fig. 2, the air feeding the engine M undergoes before it enters the cylinders compression inside the main compressor $C_A$ and further compression inside the super-charging compressor $C_s$ which may comprise one or more stages. The air feeding the engine is cooled before it is admitted into the cylinders by the cold fuel. For this purpose there are provided one or more cooling devices $r$ into which the liquefied fuel from the double walled container R is forced by the fuel pump P. Under such conditions the amount of heat required for vaporizing and heating the liquefied fuel is provided by the air feeding the piston engine M, which is equivalent in the theoretical Carnot cycle to a lowering of the temperature of the so-called "colder source" and to an increase in the efficiency of the thermic cycle of the whole of the propeller. On the other hand the specific weight of the air admitted into the cylinders of the engine M is increased thereby, which leads to an increase of the weight of air admitted into each cylinder and consequently the power per unit of weight of said engine.

Figure 3:
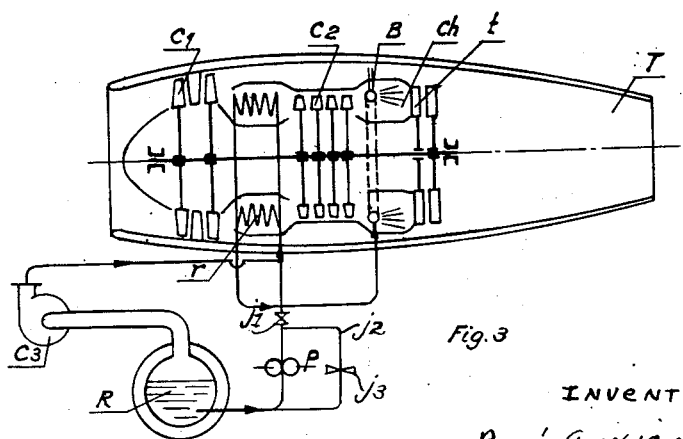

Fig. 3 shows a modification of the invention as applied to a reaction jet propeller wherein the thermic engine is constituted by a gas turbine. The arrangement comprises a preliminary air compressor $C_1$ part of the flow of air compressed by which forms the motive fluid, a further compressor $C_2$, one or more combustion chambers $Ch$ with burners B and an expansion turbine $t$ adapted to drive the compressors. The propeller ends with a reaction jet nozzle T. In this embodiment the flow of air compressed by the compressor $C_1$ is subdivided into two parts of which one passes through the by-pass leading to the nozzle T while the other feeds directly to the gas turbine. The liquefied cold fuel stored inside the double-walled container R is forced under its liquid form by the pump P into one or more cooling devices $r$ for cooling the combustion air feeding the gas turbine before it is compressed in the compressor $C_2$.

This fuel removes, for its evaporation and heating, calories from the theoretical so-called "colder source" which is the air in course of compression and transfers them to the theoretical so-called "hotter source," which increases the efficiency of the thermic cycle.

At the same time, the fraction of fuel evaporated inside the container R is forced by the compressor $C_3$ into the cooler $r$ so as to cooperate in the cooling of the flow of air undergoing compression.

Fig. 4 illustrates a modification of the arrangement of Fig. 3 wherein the totality of the flow of compressed air provided by the preliminary compressor $C_1$ takes part in the cycle of the gas turbine. In such a case, the coolers $r$ may be inserted in one or more intermediate stages of the compressor $C_1$—$C_2$. The gasified fuel removed from the container R and delivered by the compressor $C_3$, through a conduit $g$, is mixed with the air at the entrance into the compressor $C_1$.

When coolers are inserted in the flow of air during compression, and when the compressors are of the axial type in which the speed of the air is often considerable, it is important to reduce as much as possible the corresponding losses of pressure. From this standpoint, a particularly interesting arrangement consists in using as cooling surfaces the surfaces of the stationary baffles of the compressor or compressors. Figs. 5a and 5b show how this cooling may be effected.

Fig. 5a is a coaxial cross-section of the baffles of the compressor through the surface of mean diameter of the stream of air, said cross-section being developed on the plane of the drawing. 1 designates the movable blades and 2 the stationary baffles. The latter are hollow so as to allow the circulation of the cold liquid fuel or of its vapors at a low temperature. Fig. 5b is a diagrammatic projection on to a plane perpendicular to the axis of the compressor. It shows the hollow stationary baffles 2, some of which, in the upper half, are connected for instance to a feed collector 3 and the other to a return collector 4 with an inner interconnecting pipe system 5. The circulation of the cooling fluid is thus effected as illustrated by the arrows on the drawing from the collector 3 to the collector 4 through the hollow stationary baffles 2 and the pipes 5.

It may occurs that the cooling of the air passing through one or more coolers is sufficient, by reason of the low temperature of the liquid fuel, for ice due to the moisture of the air, to deposit on the exchange surfaces which would lead to the gradual closing of the passage for the air.

This drawback may be removed by returning through a by-pass a fraction of the flow of gaseous fuel from the outlet of the cooler into its inlet. In the embodiment illustrated in Fig. 6, the double-walled container R feeds the heat exchanger $r$ through the fuel pump $p$ on the one hand and the compressor $C_3$ on the other hand. Valves $r1$ and $r2$ prevent any return of the fuel towards the container. The output of the liquid fuel pump $p$ is adjusted by means of the return cock $r3$. At the output from the heat exchanger $r$, the gasified and heated fuel is sent through the pipe 6 to the internal combustion plant but a fraction thereof is returned through the pipes 7 and 8 to the inlet of said exchanger through the action of a circulation fan $C_4$. Supposing 1 kilogram is the weight of liquid fuel delivered by the fuel pump $p$ and K kg. is the weight of gasified fuel returned to the entrance of the heat exchanger $r$. The lowering of the temperature of the air inside the exchanger for vaporizing and heating the fuel up to ambient temperature will be $K+1$ times smaller than in the case where no already gasified fuel removed from the exchanger is added to the cold fuel at its entrance into the exchanger. If K is given a sufficient value it is possible to avoid thus the temperature of the air crossing the cooler from falling below icing temperature. With the same object, the gaseous fuel produced in the container under the action of thermic leakages may be introduced into the cooler through the compressor $C_3$ as shown in Figure 6.

What we claim is:

1. In a vehicle powered by a reaction jet engine including a combustion chamber and an air compressor for feeding said chamber with compressed combustion air, a heat-insulated storage vessel, inside said vessel, a liquid fuel at low temperature, said fuel belonging to the class of fuels which are gaseous at ambient temperature and pressure, the volume of said vessel above the level of liquid being filled with said fuel in the gaseous form at a pressure of the magnitude of ambient pressure, piping means between said chamber and the volume of said vessel above the level of liquid, means in said piping means for sucking up gaseous fuel from said vessel and discharging same toward said chamber, further piping means between said chamber and the volume of said vessel below the level of liquid, a portion of said further piping means being in heat-exchange relationship with said compressed combustion air, means in said latter-mentioning piping means, upstream of said portion, for sucking up liquid fuel from said vessel and discharging same into said portion, and means on said latter-mentioned piping means for controlling the flow of liquid fuel therethrough.

2. In a vehicle powered by a reaction jet engine including a combustion chamber and a multi-stage air compressor for feeding said chamber with compressed combustion air, a heat-insulated storage vessel, inside said vessel, a liquid fuel at low temperature, said fuel belonging to the class of fuels which are gaseous at ambient temperature and pressure, the volume of said vessel above the level of liquid being filled with said fuel in the gaseous form at a pressure of the magnitude of ambient pressure, piping means between said chamber and the volume of said vessel above the level of liquid, means in said piping means for sucking up gaseous fuel from said vessel and discharging same toward said chamber, further piping means between said chamber and the volume of said vessel below the level of liquid, a portion of said further piping means being in heat-exchange relationship with an intermediate stage of said multi-stage air compressor, means in said latter-mentioned piping means, upstream of said portion, for sucking up liquid fuel from said vessel and discharging same into said portion, and means on said latter-mentioned piping means for controlling the flow of liquid fuel therethrough.

3. In a vehicle powered by a reaction jet engine including a combustion chamber and a multi-stage air compressor for feeding said chamber with compressed combustion air, a heat-insulated storage vessel, inside said vessel, a liquid fuel at low temperature, said fuel belonging to the class of fuels which are gaseous at ambient temperature and pressure, the volume of said vessel above the level of liquid being filled with said fuel in the gaseous form at a pressure of the magnitude of ambient pressure, a conduit in heat-exchange relationship with an intermediate stage of said multi-stage air compressor, piping means between one end of said conduit and the volume of said vessel above the level of liquid, means in said piping means for sucking up gaseous fuel from said vessel and discharging same into said conduit, further piping means between said end and the volume of said vessel below the level of liquid, means in said further piping means for sucking up liquid fuel from said vessel and discharging same into said conduit, means on said latter-mentioned piping means for controlling the flow of liquid fuel therethrough, and piping means between the other end of said conduit and said combustion chamber.

4. In a vehicle powered by a reaction jet engine including a combustion chamber and a multi-stage air compressor for feeding said chamber with compressed combustion air, a heat-insulated storage vessel, inside said vessel, a liquid fuel at low temperature, said fuel belonging to the class of fuels which are gaseous at ambient temperature and pressure, the volume of said vessel above the level of liquid being filled with said fuel in the gaseous form at a pressure of the magnitude of ambient pressure, a conduit in heat-exchange relationship with an intermediate stage of said multi-stage air compressor, piping means between one end of said conduit and the volume of said vessel above the level of liquid, means in said piping means for continuously sucking up gaseous fuel from said vessel and discharging same into said conduit, during operation of said engine, further piping means between said end and the volume of said vessel below the level of liquid, means in said further piping means for sucking up make-up amounts of liquid fuel from said vessel and discharging same into said conduit, means on said latter-mentioned piping means for controlling the flow of liquid fuel therethrough, and piping means between the other end of said conduit and said combustion chamber.

5. The method of operating a thermic engine plant including a combustion chamber and a heat insulated fuel storage vessel, which method comprises the steps of providing in said storage vessel, in its cold, liquid phase and at substantially ambient pressure, a quantity of a fuel which is normally gaseous at ambient temperatures and pressures, said quantity being less than the volumetric capacity of said storage vessel, removing continuously the fuel gasified by normal heat losses from the top part of said vessel, feeding continuously the combustion chamber with the gasified fuel thus removed and regulating the power of the plant by feeding said combustion chamber with variable supplementary amounts of fuel removed in its cold liquid state from the bottom part of said vessel.

6. The method of operating a thermic engine plant including a combustion chamber and a heat insulated fuel storage vessel, which method comprises the steps of providing in said storage vessel, in its cold, liquid phase and at substantially ambient pressure, a quantity of a fuel which is normally gaseous at ambient temperatures and pressures, said quantity being less than the volumetric capacity of said storage vessel, removing continuously the fuel gasified by normal heat losses from the top part of said vessel, feeding continuously the combustion chamber with the gasified fuel thus removed and regulating the power of the plant by feeding said combustion chamber with variable supplementary amounts of fuel removed in its cold liquid state from the bottom part of said vessel, the fuel thus removed in its liquid state being gasified before its admission into said combustion chamber by using the heat developed in the plant.

7. The method of operating a thermic engine plant including a combustion chamber, a compressor for feeding air under pressure to said chamber, and a heat insulated fuel storage vessel, which method comprises the steps of providing in said storage vessel, in its cold, liquid phase and at substantially ambient pressure, a quantity of a fuel which is normally gaseous at ambient temperatures and pressures, said quantity being less than the volumetric capacity of said storage vessel, removing continuously the fuel gasified by normal heat losses from the top part of said vessel, feeding continuously the combustion chamber with the gasified fuel thus removed and regulating the power of the plant by feeding said combustion chamber with variable supplementary amounts of fuel removed in its cold liquid state from the bottom part of said vessel, the fuel thus removed in its liquid state being gasified before its admission into said combustion chamber by heating said fuel through the heat resulting from the compression of the air in said compressor.

8. The method of operating a thermic engine plant including a combustion chamber, a compressor for feeding air under pressure to said chamber, and a heat insulated fuel storage vessel, which method comprises the steps of providing in said storage vessel, in its cold, liquid phase and at substantially ambient pressure, a quantity of a fuel which is normally gaseous at ambient temperatures and pressures, said quantity being less than the volumetric capacity of said storage vessel, removing continuously the fuel gasified by normal heat losses from the top part of said vessel, feeding continuously the combustion chamber with the gasified fuel thus removed and removing fuel in its cold liquid state from the bottom part of said vessel, subjecting the liquid fuel thus removed to a heat exchange with the hot air under pressure issuing from the air compressor in order to gasify said fuel, feeding the combustion chamber with the liquid fuel thus gasified and regulating the power of the plant by varying the amount of liquid fuel removed from the bottom part of said vessel.

9. The method of claim 5, the fuel being hydrogen.

RENÉ ANXIONNAZ.
MARCEL HENRI LOUIS SÉDILLE.

REFERENCES CITED

The following references are of record in the file of this patent:

UNITED STATES PATENTS

| Number | Name | Date |
|---|---|---|
| 1,339,441 | Eagar | May 11, 1920 |
| 1,351,944 | Doble | Sept. 7, 1920 |
| 1,853,983 | Leach | Apr. 12, 1932 |
| 1,859,442 | Henderson | May 24, 1932 |
| 1,990,622 | Sykes | Feb. 12, 1935 |
| 2,315,882 | Trimble | Apr. 6, 1943 |
| 2,357,947 | Gerson | Sept. 12, 1944 |
| 2,359,219 | Jones | Sept. 26, 1944 |
| 2,403,831 | Sharples | July 9, 1946 |
| 2,409,611 | Bodine | Oct. 22, 1946 |
| 2,413,225 | Griffith | Dec. 24, 1946 |
| 2,503,006 | Stalker | Apr. 4, 1950 |